United States Patent
Sugawara

(10) Patent No.: US 8,242,039 B2
(45) Date of Patent: Aug. 14, 2012

(54) CORDIERITE-BASED SINTERED BODY

(75) Inventor: Jun Sugawara, Fukuoka (JP)

(73) Assignee: Krosakiharima Corporation, Fukuoka (JP)

(*) Notice: Subject to any disclaimer, the term of this patent is extended or adjusted under 35 U.S.C. 154(b) by 44 days.

(21) Appl. No.: 12/910,061

(22) Filed: Oct. 22, 2010

(65) Prior Publication Data

US 2012/0100982 A1 Apr. 26, 2012

(30) Foreign Application Priority Data

Oct. 21, 2010 (JP) ................................ 2010-236587

(51) Int. Cl.
C04B 35/195 (2006.01)
(52) U.S. Cl. ....................................... 501/119; 501/128
(58) Field of Classification Search .................. 501/119, 501/128
See application file for complete search history.

(56) References Cited

U.S. PATENT DOCUMENTS

| | | | |
|---|---|---|---|
| 6,265,334 B1 * | 7/2001 | Sechi et al. ..................... | 501/9 |
| 6,440,883 B2 * | 8/2002 | Okamura ......................... | 501/9 |
| 7,067,085 B1 * | 6/2006 | Sugawara et al. .............. | 264/676 |

FOREIGN PATENT DOCUMENTS

| | | | |
|---|---|---|---|
| JP | 58015461 A | | 1/1983 |
| JP | 57038371 A | | 3/1983 |
| JP | 11209171 | * | 8/1999 |
| JP | 11209171 A | | 8/1999 |
| JP | 11343168 A | | 12/1999 |
| JP | 2004177331 A | | 6/2004 |
| JP | 2004196589 | * | 7/2004 |
| JP | 2005234338 A | | 9/2005 |
| JP | 2005234344 A | | 9/2005 |

OTHER PUBLICATIONS

Bayer-Helms et al., Langenstabilitat, Spring 1985, Metrologia 21, 49-57.

* cited by examiner

*Primary Examiner* — Karl Group
(74) *Attorney, Agent, or Firm* — Martin Fleit; Paul D. Bianco; Fleit Gibbons Gutman Bongini & Bianco PL

(57) ABSTRACT

The present invention is intended to drastically improve a precision polishing characteristic of a cordierite-based sintered body which has low thermal expansibility, high dimensional long-term stability and high rigidity (high elastic modulus). The cordierite-based sintered body comprises cordierite as primary components, and one or more selected from the group consisting of La, Ce, Sm, Gd, Dy, Er, Yb and Y in an oxide-equivalent amount of 1 to 8 mass %, without any crystal phase other than a cordierite crystal phase. A mass ratio of primary components of the cordierite satisfies the following relations: $3.85 \leq SiO_2/MgO \leq 4.60$, and $2.50 \leq Al_2O_3/MgO \leq 2.70$, and the cordierite-based sintered body after being subjected to precision polishing has a precisely polished surface with an average surface roughness (Ra) of 1 nm or less.

17 Claims, 5 Drawing Sheets

CORDIERITE-BASED SINTERED BODY

TECHNICAL FIELD

The present invention relates to a cordierite-based sintered body suitably usable as an ultra-precision mirror or a substrate for the ultra-precision mirror.

BACKGROUND ART

Recently, in connection with the progress toward higher integration in semiconductor devices, higher precision in aspherical lenses, etc., there is a growing need for manufacturing machines and measuring machines for the semiconductor devices and aspherical lens molds to ensure high shape (dimensional) accuracy and high long-term stability of shape accuracy.

The above ultra-precision machines require a precision mirror as a mirror for positioning or a reference mirror for reflection of laser or extreme ultraviolet rays. Therefore, such a mirror is being increasingly required to have both ultrahigh precision level, and dimensional long-term stability.

Zero-expansion glass is known as a conventional material for the mirror. The zero-expansion glass can be polish-finished to have a significantly smooth surface having an average surface roughness (Ra) of 1 nm or less. However, the zero-expansion glass has a low elastic modulus (Young's modulus) of 50 to 90 GPa, which leads to a problem of dead-weight deformation or deformation resulting from acceleration. Moreover, it is known that a zero-expansion glass material exhibits a significantly large dimensional change for long-term passage, as described in the following Non-Patent Document 1, i.e., the zero-expansion glass material has a problem with dimensional long-term stability.

Meanwhile, as for a cordierite-based sintered body consisting primarily of cordierite, which is a subject matter of the present invention, the following Patent Documents 1 and 2 disclose a dense cordierite-based low-expansion sintered body containing a rare-earth oxide in an amount of 0.3 to 8 mass % or 0.01 to 10 mass %. However, this sintered body is never usable as a mirror substrate because of its porosity of several %, and a thermal expansion coefficient thereof is not sufficiently reduced.

The following Patent Document 3 discloses a low-thermal expansion black ceramics containing 80 mass % or more of cordierite and usable as position measuring mirrors of stage. In this Document, it is mentioned that a maximum void diameter of the ceramics is preferably 5 μm or less. In fact, in Example of the Patent Document 3, it is described that a measured value of the maximum void diameter was several μm. However, the ceramics having such a large void is incapable of obtaining a significantly smooth polish-finished surface having a Ra of 1 nm or less. In the Patent Document 3, a rare-earth oxide, such as $Y_2O_3$ or $Yb_2O_3$, added in an amount of 1 to 10 mass %, is precipitated as a crystal phase of silicate ($RE_2O_3 \cdot SiO_2$, wherein RE is a rare-earth element) or disilicate ($RE_2O_3 \cdot 2 SiO_2$). In such a sintered body having a mixture of a cordierite crystal phase and a crystal phase different therefrom, a micro-difference in polishing rate of precision polishing occurs between the crystals due to differences in hardness and chemical stability therebetween, which causes microscopic surface irregularities and therefore difficulty in achieving a smooth finished surface having a Ra of 1 nm or less.

The following Parent Document 4 discloses a dense low-thermal expansion ceramics containing 80 mass % or more of cordierite and usable as position measuring mirrors of stage. In the Parent Document 4, there is no description of whether a rare-earth oxide, such as $Y_2O_3$ or $Yb_2O_3$, added in an amount of 1 to 20 mass %, is formed as a silicate or disilicate crystal. However, a maximum void diameter is defined to be 5 μm or less, and, in Example, it is described that an observed value of the maximum void diameter was 0.7 μm at the minimum. Such a void occurs because it fails to adequately adjust a ratio between respective ones of $SiO_2$, MgO and $Al_2O_3$ as primary components of cordierite. The existence of such a void makes it impossible to achieve a significantly smooth polish-finished surface having a Ra of 1 nm or less.

The following Patent Documents 5 to 7 disclose a mirror made of a low-thermal expansion ceramics and designed for position measurement or astronomical telescopes. The low-thermal expansion ceramics in the Patent Documents 5 to 7 is characterized in that it comprises a composite material prepared by combining: a first material which is one or more selected from the group consisting of lithium aluminosilicate, zirconium phosphate and cordierite; and a second material which is one or more selected from the group consisting of silicon carbide, silicon nitride, sialon, alumina, zirconia, mullite, zircon, aluminum nitride, calcium silicate and $B_4C$, wherein an average surface roughness (Ra) of the ceramics is defined to be 10 nm or less.

In the Patent Documents 5 to 7, it is mentioned that a composite material of β-eucryptite and silicon carbide is preferable. However, in such a composite material prepared by mixing two or more materials largely different in hardness as in the Patent Documents 5 to 7, a micro-difference in polishing rate of precision polishing occurs between the materials, which causes microscopic surface irregularities and therefore difficulty in achieving a smooth finished surface having an average surface roughness (Ra) of 1 nm or less. In fact, in the Patent Documents 5 to 7, only a significantly rough polished surface having a Ra of 6 to 10 nm can be obtained.

Moreover, in a polycrystalline body having a mixture of two crystal grains largely different in thermal expansion coefficient, a residual stress caused by a difference in thermal expansion between the crystal grains formed during sintering of the materials remains in an obtained sintered body, which causes a problem that a secular change in shape of the sintered body is likely to occur, and, particularly, a large change in the shape occurs when the sintered body undergoes a temperature cycle of several ten ° C.

PRIOR ART DOCUMENTS

Patent Documents

[Patent Document 1] JP 58-15461B
[Patent Document 2] JP 57-38371A
[Patent Document 3] JP 11-343168A
[Patent Document 4] JP 11-209171A
[Patent Document 5] JP 3946132B
[Patent Document 6] JP 2005-234338A
[Patent Document 7] JP 4460325B Non-Patent Documents

[Non-Patent Document 1] Meteologia 21, 49-57 (1985)

SUMMARY OF THE INVENTION

Problem to be Solved by the Invention

As described above, there has not been any material which has all of low thermal expansibility, high dimensional long-term stability, high rigidity (high elastic modulus), and excellent precision polishing characteristic capable of being precisely polish-finished to achieve an average surface roughness (Ra) of 1 nm or less, and thereby it has been impossible to produce an ultra-precision mirror having all of the capabilities.

In view of the above circumstances, it is an object of the present invention to drastically improve a precision polishing characteristic of a cordierite-based sintered body which has low thermal expansibility, high dimensional long-term stability and high rigidity (high elastic modulus).

Means for Solving the Problem

Through various researches, the inventors found that the above object can be achieved by a cordierite-based sintered body which comprises specific components and has a specific ratio of the components, and has accomplished the present invention.

Specifically, the present invention provides a cordierite-based sintered body which comprises cordierite as primary components, and one or more selected from the group consisting of La, Ce, Sm, Gd, Dy, Er, Yb and Y in an oxide-equivalent amount of 1 to 8 mass %, without any crystal phase other than a cordierite crystal phase, wherein a mass ratio between respective ones of the primary components satisfies the following relations: $3.85 \leq SiO_2/MgO \leq 4.60$, and $2.50 \leq Al_2O_3/MgO \leq 2.70$, and the cordierite-based sintered body after being subjected to precision polishing has a precisely polished surface with an average surface roughness (Ra) of 1 nm or less.

As above, in the cordierite-based sintered body of the present invention, a crystal phase consists only of a cordierite phase, so that it becomes possible to avoid surface irregularities to be caused by a difference in polishing characteristics between different crystal grains. Generally, the remaining components other than the cordierite exist as an amorphous phase in the form of a film along grain boundaries of cordierite grains. However, if an amount of the amorphous phase is excessively large, the amorphous phase remains in an island shape, which is undesirably likely to form pits during precision polishing.

Thus, the oxide-equivalent amount of the one or more selected from the group consisting of La, Ce, Sm, Gd, Dy, Er, Yb and Y is set in the range of 1 to 8 mass %. Preferably, an amount of the cordierite crystal is 85 mass % or more of the total.

Further, in the present invention, the mass ratio between respective ones of $SiO_2$, MgO and $Al_2O_3$ as primary components of the cordierite is limited as above, which makes it possible to fulfill desired capabilities.

If a mechanochemical polishing rate of the amorphous phase in the sintered body is largely different from that of the cordierite, surface irregularities are likely to occur during precision polishing. Thus, it is necessary that corrosion resistance of the amorphous phase is a high level equal to that of the cordierite crystal. A compound of at least one of La, Ce, Sm, Gd, Dy, Er, Yb and Y may be used as a sintering additive. In this case, an amorphous phase having corrosion resistance close to that of the cordierite crystal is more likely to be formed. In view of precision polishing characteristics, a La or Ce oxide is particularly preferably used.

Effect of the Invention

The present invention can drastically improve precision polishing characteristics of a cordierite-based sintered body which has low thermal expansibility, high rigidity (high elastic modulus) and dimensional long-term stability. This makes it possible to form an ultra-precision mirror to have a significantly smooth surface with an average surface roughness of 1 nm or less.

DESCRIPTION OF EMBODIMENTS

Figure 1:
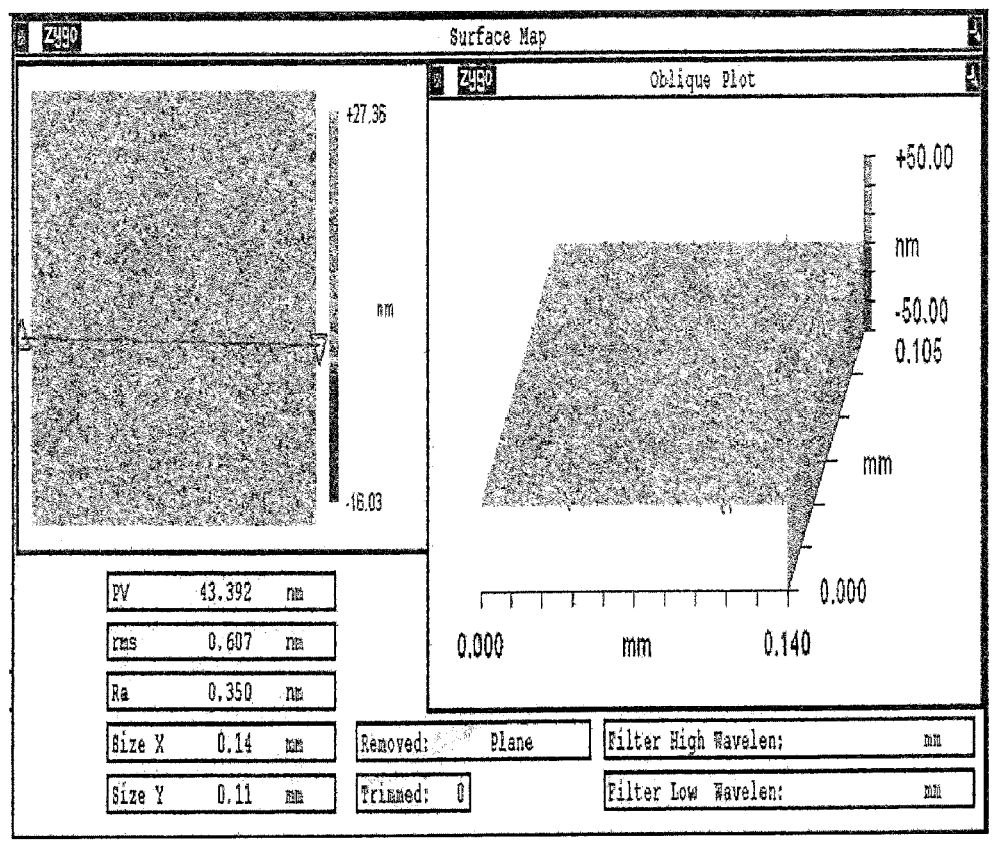
FIG. 1 shows a measurement result of surface roughness of the sample NO. 16 as one of inventive samples in Table 1.

In the present invention, the term "cordierite crystal phase" means a crystal phase including a pure hexagonal cordierite crystal phase, and a crystal phase which exhibits a diffraction peak of a hexagonal cordierite crystal as measured by X-ray diffractometry, but has a lattice constant different from the hexagonal cordierite crystal due to other element incorporated therein as a solid solution. Further, the term "without any crystal phase other than a cordierite crystal phase" means that any diffraction peak other than that of a cordierite crystal cannot be observed under commonly-used measurement conditions of powder X-ray diffractometry for a sintered body, wherein slight irregularities of a baseline inevitably occurs due to noise, a diffraction line of an amorphous phase, etc. Thus, as used in the present invention, the term "without any crystal phase other than a cordierite crystal phase" means a state in which any peak height other that that of cordierite is 3% or less of a maximum peak height of cordierite.

One or more of La, Ce, Sm, Gd, Dy, Er, Yb and Y exist as an amorphous phase, along grain boundaries of cordierite crystal grains, or is slightly incorporated in a cordierite-based crystal as a solid solution. If an oxide-equivalent amount of one or more of La, Ce, Sm, Gd, Dy, Er, Yb and Y is less than 1 mass %, will significantly deteriorate sinterability. Consequently, it becomes difficult to increase density, and remain a large number of residual voids undesirably. Otherwise if the oxide-equivalent amount is greater than 8 mass %, a silicate or a disilicate crystal containing one or more of La, Ce, Sm, Gd, Dy, Er, Yb and Y is undesirable likely to be formed. Even if such a silicate or disilicate crystal is not formed, an amorphous phase of one or more of the elements will be increased. Consequently, a thermal expansion coefficient undesirably becomes higher, and surface irregularities are undesirably likely to occur during precision polishing. More preferably, the oxide-equivalent amount of one or more of the elements is in the range of 2 to 6 mass %

If a mass ratio of $SiO_2$ to MgO is less than 3.85, a forsterite crystal phase or a disilicate crystal phase containing one or more of La, Ce, Sm, Gd, Dy, Er, Yb and Y oxides will be precipitated. Consequently, surface irregularities are undesirably likely to occur during precision polishing. Otherwise if the mass ratio of $SiO_2$ to MgO is greater than 4.60, an elastic modulus will be reduced to less than 130 MPa. Moreover, a cristobalite crystal phase is likely to be formed, which is undesirable in view of precision polishing. The mass ratio of $SiO_2$ to MgO is preferably in the range of 4.00 to 4.40, more preferably in the range of 4.00 to 4.20.

If a mass ratio of $Al_2O_3$ to MgO is greater than 2.70, an amount of $Al_2O_3$ becomes relatively excessive, so that fine $Al_2O_3$ crystal grains having a grain size of several ten to several hundred nm will be incorporated in cordierite grains or grain boundaries thereof. The cordierite grains incorporating the nano-order fine $Al_2O_3$ crystal grains cause deterioration in precision polishing characteristic, and leftover bumps having a diameter of several μm during precision polishing. Consequently, an average surface roughness is undesirably increased to greater than 1 nm. If the amount of $Al_2O_3$ becomes more excessive, a mullite crystal will be formed. The formation of a mullite crystal also undesirably causes surface irregularities during precision polishing.

If the mass ratio of $Al_2O_3$ to MgO is less than 2.50, pits having a macro-diameter of several ten to several hundred μm and a depth of several hundred nm will undesirably occur, although the average surface roughness will not so deteriorate. This phenomenon would occur because an Al-deficient region macroscopically occurs due to a reduction in element content of Al, and become more likely to be chemically or mechanically polished. Further, if the mass ratio of $Al_2O_3$ to MgO is extremely small, disilicate containing one or more of La, Ce, Sm, Gd, Dy, Er, Yb and Y oxides, forsterite, cristobalite or the like other than cordierite will be formed, which is undesirable in view of precision polishing and thermal expansion. The mass ratio of $Al_2O_3$ to MgO is preferably in the range of 2.55 to 2.70, more preferably in the range of 2.55 to 2.65.

As for a raw material powder in the present invention, an MgO source may include a magnesia powder, a talc powder, a fused cordierite powder, a synthetic cordierite powder, a magnesium hydroxide powder, magnesium carbonate powder and a magnesia spinel powder. Among them, in view of sinterability of a green compact having a large size or a complicated shape, it is most preferable to use the fused cordierite powder and the synthetic cordierite powder as a raw material powder. As an $Al_2O_3$ source or a $SiO_2$ source, it is preferable to use a fine alumina powder, a crystalline silica powder and an amorphous silica powder, in addition to the talc powder, the fused cordierite powder and the synthetic cordierite powder. As a La, Ce, Sm, Gd, Dy, Er, Yb or Y source, it is most preferable to use an oxide, hydroxide or carbonate power thereof as a raw material power. An average particle size of each power is preferably set to a fine particle diameter of 0.1 to 5 nm in view of dispersibility.

An applicable sintering process may include a hot press process, an HIP process, a gas-pressure sintering process and a pressureless sintering process. As a prerequisite to reducing the average surface roughness during precision polishing, pores in the sintered body must be minimized in number. Thus, in a final heat treatment step, it is necessary to perform a heat treatment in a pressurized gas atmosphere, such as the HIP process or the gas-pressure sintering process.

Preferably, the sintered body has an elastic modulus (Young's modulus) of 130 GPa or more to reduce deadweight deformation and deformation to be caused by receiving acceleration.

Considering thermal deformation of a mirror, it is desirable to minimize a thermal expansion coefficient. Specifically, the thermal expansion coefficient is preferably $0.2 \times 10^{-6}$/K or less, more preferable $0.05 \times 10^{-6}$/K or less, as measured at room temperatures (20 to 25° C.). The sintered body has significantly small thermal expansion. Thus, the thermal expansion coefficient is measured according to JIS R3251 (method for measuring a linear expansion coefficient of a low-expansion glass by laser interferometric method).

Considering that dimensional long-term stability is a critical factor, a length-dimensional secular change per one year is preferably 10 nm or less, more preferably 5 nm or less, with respect to 100 mm length. In measurement of the long-term stability, a significant small dimensional change has to be measured, so that it is necessary to employ a precision measurement method. For example, the dimensional long-term stability may be measured by laser interferometric method using a block gauge-shaped long sample.

The cordierite-based sintered body of the present invention is suitably usable as an ultra-precision mirror. In this case, a structural shape of the mirror may includes a solid flat plate-shaped structure, a solid rectangular columnar-shapes structure, a ribbed structure, and a box-shaped structure comprising a ribbed body (ribbed structure) and a lid joined to the ribbed body. Further, the cordierite-based sintered body of the present invention may be formed with a screw hole and formed into a complicated shape. Thus, it is possible to produce a mirror system integrally having the mirror and a mirror holder which incorporates a fine movement mechanism. A surface of the mirror may include a planar surface, a spherical surface and an aspherical surface.

In a mirror for used on a stage having large acceleration, or a mirror for used in outer space, it is essential to save a weight of the mirror. In this case, a thin-walled ribbed structure can be effectively used. Further, a lid may be joined to the ribbed body to form a box-shaped structure, which is effective in preventing deformation such as self-deformation. In an ultra-lightweight mirror joined to the ribbed body in the above manner, an apparent specific gravity thereof is preferably 1.5 $g/cm^3$ or less, more preferably 1.0 $g/cm^3$ or less The cordierite-based sintered body of the present invention allows the above lid joined to the ribbed body to be polish-finished to have a flat mirror surface with a flatness λ/10 (wherein λ is 0.63 μm which is a laser wavelength of a measurement unit), without adverse effects of the rib arrangement.

The cordierite-based sintered body of the present invention can be precisely polished by lapping and polishing using silica-based, ceria-based and diamond-based abrasive particles. It is noted that silica-based abrasive particles has a significantly high mechanochemical polishing rate with respect to the cordierite-based sintered body of the present invention, and thereby a difference in polishing rate is more likely to occur depending on position. Thus, in the precision polishing for the cordierite-based sintered body of the present invention, it is preferable to mainly use ceria-based and diamond-based abrasive particles. However, in the cordierite-based sintered body of the present invention, polishing using only diamond-based abrasive particles is likely to cause striation, and a damaged layer due to residual stress in polishing. Thus, it is preferable to use ceria-based abrasive particles having a mechanochemical effect and diamond-based abrasive particles in combination. Based on this polishing technique, a more precise polished surface can be obtained without residual stress.

The present invention will be more specifically described below based on the following examples.

Example 1

As raw martial powders, a synthetic cordierite powder (average particle size: 2.5 μm), a magnesia powder (average particle size: 0.2 μm), a silica powder (average particle size:

0.7 µm) and an alumina powder (average particle size: 0.3 µm) were prepared, and respective amounts of these powders were adjusted to obtain cordierite having a given $Al_2O_3$/MgO ratio and a given $SiO_2$/MgO ratio. Further, as a sintering additive, a lanthanum oxide powder (average particle size: 1.1 µm), a cerium oxide powder (average particle size: 0.7 µm), a samarium oxide (average particle size: 0.8 µm), a gadolinium oxide powder (average particle size: 1.2 µm), a dysprosium oxide powder (average particle size: 2.5 µm), an erbium oxide powder (average particle size: 1.4 µm), a ytterbium oxide powder (average particle size: 1.0 µm), a yttrium oxide powder (average particle size: 0.8 µm) and a spodumene powder (average particle size: 2.5 µm) were used. Specifically, the synthetic cordierite powder was manufactured with the magnesia powder, the silica powder and the alumina powder in a theoretical composition at 1420° C. for 10 hours. Then, the manufactured granular cordierite was pulverized and used.

The above raw material powers were blended to have respective compositions as shown in Table 1. Then, a resin binder was added to each of the compositions in an amount of 3 mass parts with respect to and in addition to 100 mass parts of the composition, and they were mixed together in an alumina pot-mill for 24 hours by using water as a solvent. A resulting slurry was dried and granulated, and the obtained granules were compressed into a given shape under a hydrostatic pressure of 150 MPa. The obtained shaped body was heated up to 500° C. in air to be de-waxed the resin binder. Then, the de-waxed body was sintered in an argon atmosphere under a gas pressure of 180 MPa at a maximum temperature of 1360° C.

A thermal expansion coefficient (at room temperatures (20 to 25° C.)) and an elastic modulus (Young's modulus) of the resulting sintered body were measured. Further, a sample of the sintered body having a size of φ100×20 mm thickness was subjected to precision polishing, and an average surface roughness (Ra) of the polished sample was measured by non-contact scanning white-light interferometric method. The precision polishing comprised intermediate finishing using a slurry containing ceria abrasive having an average particle size of 1 µm, and final finishing using a slurry containing diamond abrasive having an average particle size of 0.5 µm.

The measurement of a thermal expansion coefficient (at room temperatures) requires a high degree of precision. Thus, the thermal expansion coefficient was measured according to JIS R3251 which defines measurement for thermal expansion of a low-expansion glass (double-pass Michelson-type interferometric method).

TABLE 1

| | | Chemical composition (mass %) | | | A/M *1 | S/M *2 | Type of | Amount of | Crystal | Thermal expansion coefficient at | Elastic modulus | Average surface |
|---|---|---|---|---|---|---|---|---|---|---|---|---|
| | No | MgO | Al₂O | SiO₂ | (mass ratio) | (mass ratio) | additive | additive | phase *3 | room | GPa | Ra (nm) |
| Comparative sample | 1 | 13.3 | 33.3 | 49.3 | 2.50 | 3.70 | La2O3 | 4.0 | Co. + L2S | 0.56 | 149 | 1.85 |
| Comparative sample | 2 | 13.0 | 35.0 | 48.0 | 2.70 | 3.70 | La2O3 | 4.0 | Co. + L2S | 0.41 | 150 | 1.92 |
| Comparative sample | 3 | 13.2 | 32.2 | 50.6 | 2.45 | 3.85 | La2O3 | 4.0 | Co. + Cr. + L2S | −0.35 | 146 | 3.82 |
| Inventive Sample | 4 | 13.1 | 32.7 | 50.3 | 2.50 | 3.85 | La2O3 | 4.0 | Co. | −0.08 | 142 | 0.92 |
| Inventive Sample | 5 | 13.0 | 33.1 | 49.9 | 2.55 | 3.85 | La2O3 | 4.0 | Co. | −0.04 | 145 | 0.48 |
| Inventive Sample | 6 | 12.9 | 33.5 | 49.6 | 2.60 | 3.85 | La2O3 | 4.0 | Co. | −0.01 | 146 | 0.36 |
| Inventive Sample | 7 | 12.8 | 33.9 | 49.3 | 2.65 | 3.85 | La2O3 | 4.0 | Co. | 0.05 | 146 | 0.42 |
| Inventive Sample | 8 | 12.7 | 34.3 | 49.0 | 2.70 | 3.85 | La2O3 | 4.0 | Co. | 0.08 | 147 | 0.87 |
| Comparative sample | 9 | 12.6 | 34.7 | 48.6 | 2.75 | 3.85 | La2O3 | 4.0 | Co. + Mu | 0.12 | 142 | 2.71 |
| Inventive Sample | 10 | 12.8 | 32.0 | 51.2 | 2.50 | 4.00 | La2O3 | 4.0 | Co. | −0.07 | 139 | 0.34 |
| Inventive Sample | 11 | 12.6 | 32.8 | 50.5 | 2.60 | 4.00 | La2O3 | 4.0 | Co. | −0.04 | 142 | 0.26 |
| Inventive Sample | 12 | 12.5 | 33.7 | 49.9 | 2.70 | 4.00 | La2O3 | 4.0 | Co. | −0.05 | 143 | 0.33 |
| Inventive Sample | 13 | 12.5 | 31.2 | 52.4 | 2.50 | 4.20 | La2O3 | 4.0 | Co. | 0.01 | 145 | 0.29 |
| Inventive Sample | 14 | 12.2 | 32.8 | 51.0 | 2.70 | 4.20 | La2O3 | 4.0 | Co. | 0.03 | 143 | 0.31 |
| Inventive Sample | 15 | 12.2 | 30.4 | 53.5 | 2.50 | 4.40 | La2O3 | 4.0 | Co. | 0.04 | 138 | 0.44 |
| Inventive Sample | 16 | 12.0 | 31.2 | 52.8 | 2.60 | 4.40 | La2O3 | 4.0 | Co. | 0.01 | 137 | 0.35 |
| Inventive Sample | 17 | 11.9 | 32.0 | 52.1 | 2.70 | 4.40 | La2O3 | 4.0 | Co. | −0.02 | 138 | 0.42 |
| Comparative sample | 18 | 11.9 | 29.2 | 54.9 | 2.45 | 4.60 | La2O3 | 4.0 | Co. + Cr. + L2S | 0.46 | 142 | 4.25 |
| Inventive Sample | 19 | 11.9 | 29.6 | 54.5 | 2.50 | 4.60 | La2O3 | 4.0 | Co. | 0.07 | 140 | 0.72 |
| Inventive Sample | 20 | 11.7 | 30.4 | 53.9 | 2.60 | 4.60 | La2O3 | 4.0 | Co. | 0.07 | 142 | 0.49 |
| Inventive Sample | 21 | 11.6 | 31.2 | 53.2 | 2.70 | 4.60 | La2O3 | 4.0 | Co. | 0.08 | 136 | 0.55 |
| Comparative sample | 22 | 11.5 | 31.6 | 52.9 | 2.75 | 4.60 | La2O3 | 4.0 | Co. + Mu. + Cr. | 0.66 | 133 | 2.35 |
| Comparative sample | 23 | 11.7 | 29.3 | 55.0 | 2.50 | 4.70 | La2O3 | 4.0 | Co. + Cr. | 1.02 | 125 | 2.12 |
| Comparative sample | 24 | 11.4 | 30.9 | 53.7 | 2.70 | 4.70 | La2O3 | 4.0 | Co. + Cr. | 0.62 | 129 | 3.45 |
| Comparative sample | 25 | 12.8 | 33.2 | 53.6 | 2.60 | 4.20 | La2O3 | 0.5 | Co. + Cr. | −0.08 | 110 | 10.42 |
| Inventive Sample | 26 | 12.7 | 33.0 | 53.3 | 2.60 | 4.20 | La2O3 | 1.0 | Co. | −0.04 | 130 | 0.98 |
| Inventive Sample | 27 | 12.6 | 32.7 | 52.8 | 2.60 | 4.20 | La2O3 | 2.0 | Co. | −0.04 | 135 | 0.50 |
| Inventive Sample | 28 | 12.3 | 32.0 | 51.7 | 2.60 | 4.20 | La2O3 | 4.0 | Co. | 0.00 | 145 | 0.24 |
| Inventive Sample | 29 | 12.1 | 31.3 | 50.6 | 2.60 | 4.20 | La2O3 | 6.0 | Co. | 0.02 | 152 | 0.41 |
| Inventive Sample | 30 | 11.8 | 30.7 | 49.5 | 2.60 | 4.20 | La2O3 | 8.0 | Co. | 0.05 | 157 | 0.87 |
| Comparative sample | 31 | 11.5 | 30.0 | 48.5 | 2.60 | 4.20 | La2O3 | 10.0 | Co. +L2S | 0.22 | 156 | 2.78 |
| Inventive Sample | 32 | 12.3 | 32.0 | 51.7 | 2.60 | 4.20 | CeO2 | 4.0 | Co. | −0.02 | 146 | 0.34 |
| Inventive Sample | 33 | 12.3 | 32.0 | 51.7 | 2.60 | 4.20 | Sm2O3 | 4.0 | Co. | −0.05 | 143 | 0.65 |
| Inventive Sample | 34 | 12.3 | 32.0 | 51.7 | 2.60 | 4.20 | Gd2O3 | 4.0 | Co. | 0.04 | 145 | 0.82 |
| Inventive Sample | 35 | 12.3 | 32.0 | 51.7 | 2.60 | 4.20 | Dy2O3 | 4.0 | Co. | −0.05 | 142 | 0.72 |
| Inventive Sample | 36 | 12.3 | 32.0 | 51.7 | 2.60 | 4.20 | Er2O3 | 4.0 | Co. | −0.06 | 140 | 0.74 |
| Inventive Sample | 37 | 12.3 | 32.0 | 51.7 | 2.60 | 4.20 | Yb2O3 | 4.0 | Co. | 0.04 | 146 | 0.59 |
| Inventive Sample | 38 | 12.3 | 32.0 | 51.7 | 2.60 | 4.20 | Y2O3 | 4.0 | Co. | −0.03 | 144 | 0.54 |
| Comparative sample | 39 | 12.3 | 32.0 | 51.7 | 2.60 | 4.20 | spodumene | 4.0 | Co. | 0.03 | 128 | 1.25 |

*1 A/M = Al₂O₃/MgO (mass ratio)

TABLE 1-continued

| No | Chemical composition (mass %) MgO | Chemical composition (mass %) Al₂O | Chemical composition (mass %) SiO₂ | A/M *1 (mass ratio) | S/M *2 (mass ratio) | Type of additive | Amount of additive | Crystal phase *3 | Thermal expansion coefficient at room | Elastic modulus GPa | Average surface Ra (nm) |
|---|---|---|---|---|---|---|---|---|---|---|---|

Figure 2:
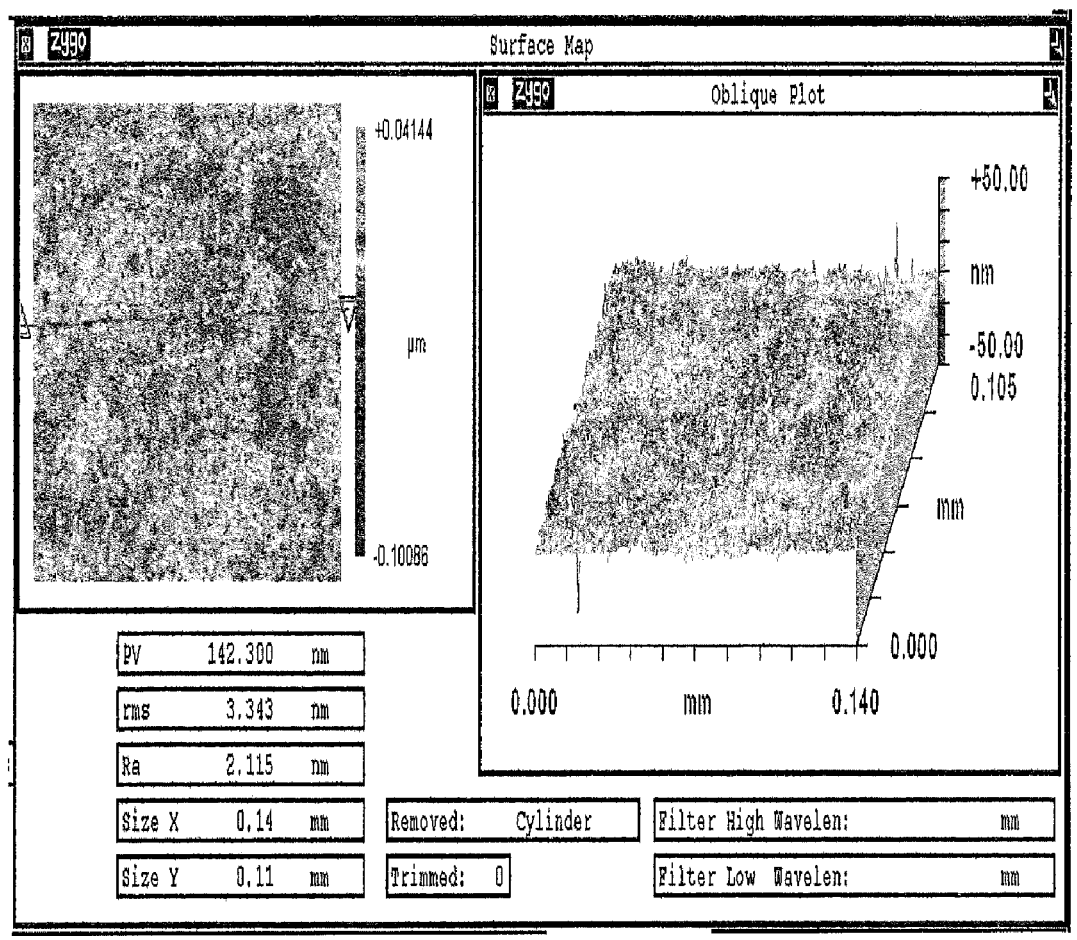
FIG. 2 shows a measurement result of surface roughness of the sample NO. 23 as one of comparative samples in Table 1.

*2 S/M = SiO₂/MgO (mass ratio)
*3 Co. = cordierite
L2S = La₂O₃ · 2SiO₂
Cr. = cristobalite
Mu. = mullite FIG. 1 shows a measurement result of surface roughness of the sample NO. 16 as one of inventive samples, and FIG. 2 shows a measurement result of surface roughness of the sample NO. 23 as one of comparative samples.

As is clear from Table 1, the average surface roughness (Ra) of each of the inventive examples is 1 nm or less. Further, as is clear from the sample NOS. 1 to 24, the mass ratio of $Al_2O_3$ to MgO is preferably in the range of 2.55 to 2.70, more preferably in the range of 2.55 to 2.65. Further, the mass ratio of $SiO_2$ to MgO is preferably in the range of 4.00 to 4.40, more preferably in the range of 4.00 to 4.20.

If the mass ratio of $Al_2O_3$ to MgO or the mass ratio of $SiO_2$ to MgO is beyond the range defined in the appended claims, a crystal phase other than cordierite will be formed, which causes difficulty in allowing the Ra to be 1 nm or less.

As is clear from the sample NOS. 25 to 31, an amount of $La_2O_3$ is required to be in the range of 1 to 8 mass %, more preferably in the range of 2 to 6 mass %. If the amount of $La_2O_3$ is less than 1 mass %, a cristobalite crystal phase will be formed, and a density of the sintered body will not be sufficiently increased, which causes deterioration in the precision polishing characteristic, and lowering in the elastic modulus. Otherwise if the amount of $La_2O_3$ is greater than 8 mass %, a $La_2O_3 \cdot 2SiO_2$ crystal phase will be formed, which also causes deterioration in the precision polishing characteristic.

As is clear from the sample NOS. 32 to 38, in addition to the La compound, each compound of Ce, Sm, Gd, Dy, Er, Yb and Y may be used as a sintering additive. Among them, the Ce compound is particularly preferable.

Example 2

A block gauge was prepared for each of the sample NOS. 11, 16 and 28 as ones of the inventive samples and the sample NOS. 1 and 31 as ones of the comparative examples, and a dimensional change for long-term passage thereof was checked. Laser interferometric method was used as a checking method, and the dimensional change for long-term passage was expressed as a change in length which has occurred with respect to 100 mm and per one year. The sample NOS. 11, 16 and 28 as ones of the inventive samples had significantly small changes of 3 nm, 4 nm and 4 nm, respectively, whereas the sample NOS. 1 and 31 as ones of the comparative examples had changes of 24 nm and 32 nm, respectively. This clearly shows that the inventive samples are excellent in dimensional long-term stability.

Example 3

Figure 3:
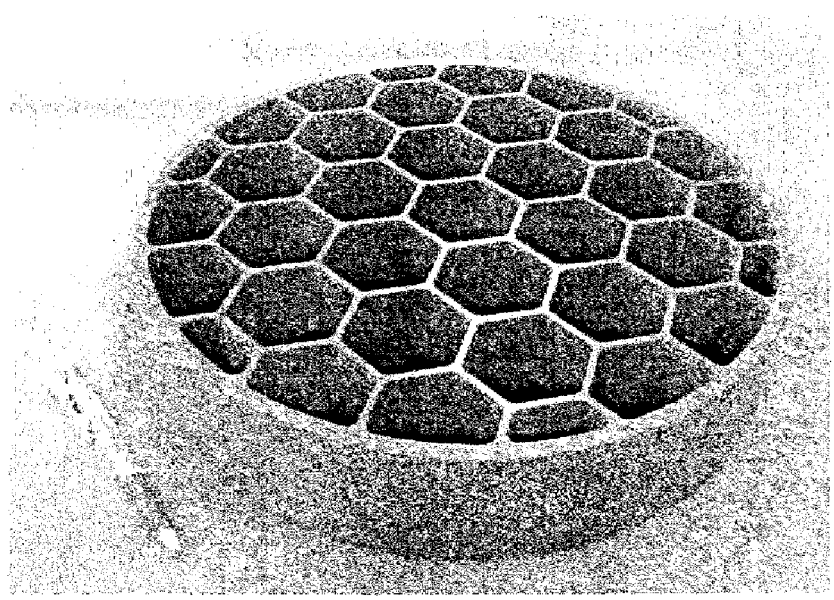
FIG. 3 shows an external appearance of a ribbed body constituting a joined box-type mirror.

After forming a plurality of green bodies based on each of the compositions of the sample NOS. 11, 16 and 28 in Table 1 in the same manner as that in Example 1, one of the green bodies was subjected to machining (cutting) to obtain a ribbed body having a structure illustrated in FIG. 3. Further, a circular plate illustrated in FIG. 4 which has many air vent holes corresponding to respective ones of a plurality of cells defined by a rib arrangement was formed by a green machining.

The green machined ribbed body and the circular plate were heated up to 500° C. in air to be de-waxed the resin binder, and then sintered in an argon atmosphere at 1400° C. Then, after subjecting respective joint surfaces of the sintered bodies to grinding, the sintered bodies were joined together at 1400° C. Finally, the integrated body was subjected to heat treatment in an argon atmosphere of 180 MPa at 1400° C.

An outer periphery of the sintered box-type mirror was subjected to grinding, and, finally, a mirror surface was finished by precision polishing in the same manner as that in Example 1.

Figure 4:
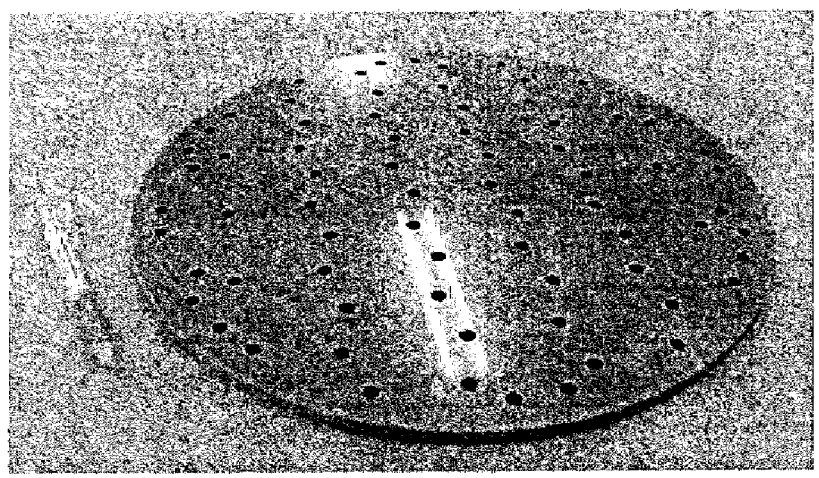
FIG. 4 shows an external appearance of a lid constituting the joined box-type mirror.
Figure 5:
FIG. 5 shows an external appearance of a joined box-type mirror obtained from a cordierite-based sintered body of the present invention.

FIG. 5 shows an external appearance of the obtained box-type mirror. The specifications of the box-type mirror are shown in Table 2. FIG. 3 shows an external appearance of the ribbed body before the joining, and FIG. 4 shows an external appearance of the lid (circular plate) before the joining.

TABLE 2

| | |
|---|---|
| Outer diameter | φ340 |
| Accuracy region | φ300 |
| Height | 70 mm |
| Thickness of rib | 3 mm |
| Rib arrangement | hexagonal cells |
| Depth of rib | 55 mm |
| Thickness of lid | 5 mm |
| Thickness of mirror region | 10 mm |

The obtained box-type mirror had a weight of 5.2 to 5.7 kg, and an apparent density of 0.82 to 0.90 g/cm³ with respect to an external size. Further, under a condition that the box-type mirror was supported at three points on a circle of φ332 and held horizontally, a flatness of the mirror surface was measured by a laser interferometric flatness-measuring machine. A flatness in an accuracy region (φ300) subjected to the measurement was 36 to 62 nm, which is λ/10 or less. This shows that the mirror surface is extremely precisely finished.

Figure 6:
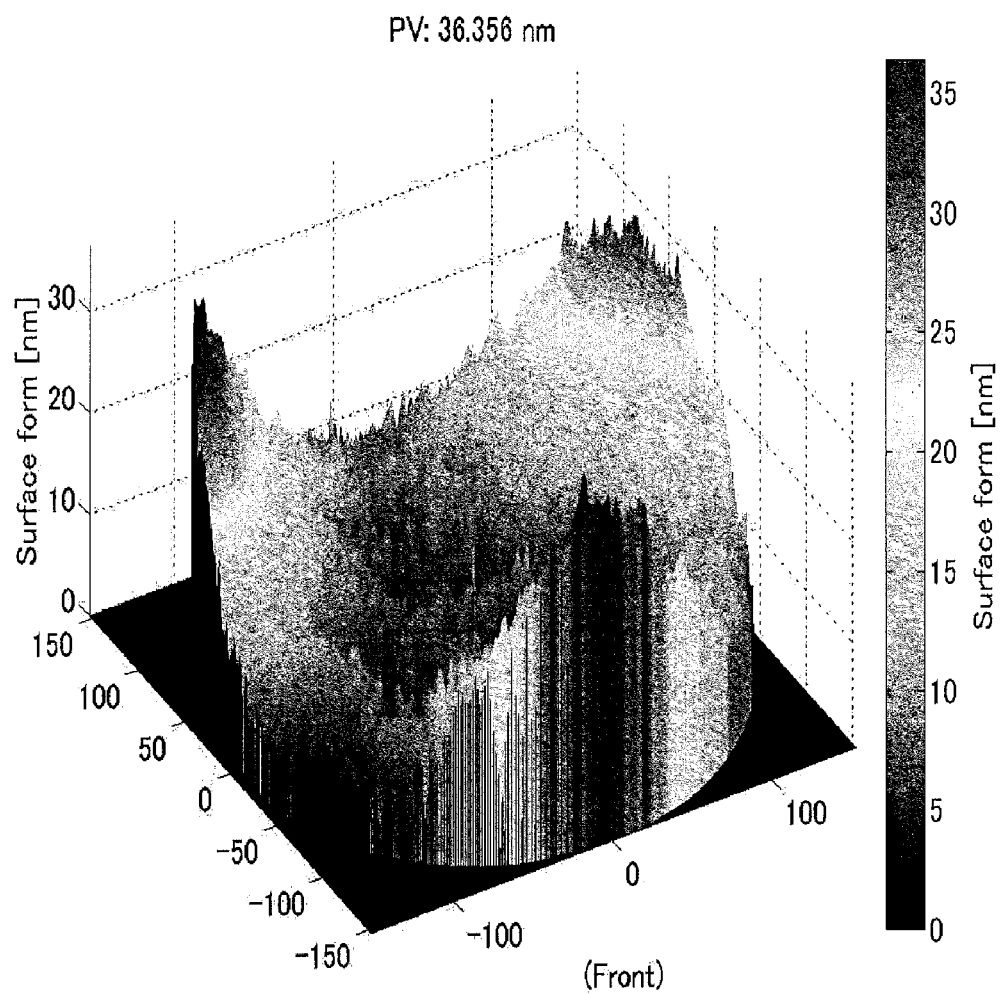
FIG. 6 is a bird's-eye view showing a flatness of a joined box-type mirror obtained based on a composition of a sample NO. 28 in Table 1.

FIG. 6 is a bird's-eye view showing a flatness of a box-type mirror obtained based on the composition of the sample NO. 28 in Table 1. As seen in FIG. 6, although the mirror is self-deformed with respect to three tips located at three support points, an amount of the deformation is extremely small, which shows that this lightweight mirror has sufficient rigidity as a structural body. This mirror had an average surface roughness (Ra) of 0.26 nm.

INDUSTRIAL APPLICABILITY

In addition to an ultra-precision mirror and a substrate for the ultra-precision mirror, the cordierite-based sintered body of the present invention is usable as a scale substrate and gauges for an encoder, a standard scale for calibration, a reference scale, an optical flat or a photomask standard.

What is claimed is:

1. A cordierite-based sintered body comprising cordierite and one or more selected from the group consisting of La, Ce, Sm, Gd, Dy, Er, Yb and Y in an oxide-equivalent amount of 1 to 8 mass %, without any crystal phase other than a cordierite crystal phase, wherein a mass ratio between respective components of the cordierite satisfies the following relations: $3.85 \leqq SiO_2/MgO \leqq 4.60$, and $2.50 \leqq Al_2O_3/MgO \leqq 2.70$, and the cordierite-based sintered body, after being subjected to precision polishing, has a precisely polished surface with an average surface roughness (Ra) of 1 nm or less.

2. The cordierite-based sintered body as defined in claim 1, wherein the precisely polished surface has an average surface roughness (Ra) of 0.5 nm or less.

3. The cordierite-based sintered body as defined in claim 1, which wherein the cordierite-based sintered body has an absolute value of a thermal expansion coefficient of $0.2 \times 10^{-6}/°C$. or less, as measured at a temperature of 20 to 25° C.

4. The cordierite-based sintered body as defined in claim 1, wherein the cordierite-based sintered body has an elastic modulus of 130 GPa or more.

5. The cordierite-based sintered body as defined in claim 1, wherein the cordierite-based sintered body has a length-dimensional secular change per year of 10 nm or less with respect to 100 mm length.

6. A cordierite-based sintered body comprising:
cordierite, the cordierite including $SiO_2$, MgO, and $Al_2O_3$ components; and
one or more selected from the group consisting of La, Ce, Sm, Gd, Dy, Er, Yb, and Y in an oxide-equivalent amount of 1 to 8 mass %, without any crystal phase other than a cordierite crystal phase, wherein a mass ratio between the components satisfies: $3.85 \leqq SiO_2/MgO \leqq 4.60$, and $2.50 \leqq Al_2O_3/MgO \leqq 2.70$, and wherein the cordierite-based sintered body, after being subjected to precision polishing, has a precisely polished surface with an average surface roughness (Ra) of 1 nm or less.

7. The cordierite-based sintered body as defined in claim 6, wherein the precisely polished surface has an average surface roughness (Ra) of 0.5 nm or less.

8. The cordierite-based sintered body as defined in claim 6, wherein the cordierite-based sintered body has an absolute value of a thermal expansion coefficient of $0.2 \times 10^{-6}/°C$. or less, as measured at a temperature of 20 to 25° C.

9. The cordierite-based sintered body as defined in claim 6, wherein the cordierite-based sintered body has an elastic modulus of 130 GPa or more.

10. The cordierite-based sintered body as defined in claim 6, wherein the cordierite-based sintered body has a length-dimensional secular change per year of 10 nm or less with respect to 100 mm length.

11. A precision-polished cordierite-based sintered body comprising:
cordierite, the cordierite including $SiO_2$, MgO, and $Al_2O_3$ components;
one or more selected from the group consisting of La, Ce, Sm, Gd, Dy, Er, Yb, and Y in an oxide-equivalent amount of 1 to 8 mass %, and
a precisely polished surface with an average surface roughness (Ra) of 1 nm or less, wherein the precision-polished cordierite-based sintered body has no crystal phase other than a cordierite crystal phase and wherein a mass ratio between the components satisfies: $3.85 \leqq SiO_2/MgO \leqq 4.60$, and $2.50 \leqq Al_2O_3/MgO \leqq 2.70$.

12. The precision-polished cordierite-based sintered body as defined in claim 11, wherein the precisely polished surface has an average surface roughness (Ra) of 0.5 nm or less.

13. The precision-polished cordierite-based sintered body as defined in claim 11, wherein the precision-polished cordierite-based sintered body has an absolute value of a thermal expansion coefficient of $0.2 \times 10^{-6}/°C$. or less, as measured at a temperature of 20 to 25° C.

14. The precision-polished cordierite-based sintered body as defined in claim 11, wherein the precision-polished cordierite-based sintered body has an elastic modulus of 130 GPa or more.

15. The precision-polished cordierite-based sintered body as defined in claim 11, wherein the precision-polished cordierite-based sintered body has a length-dimensional secular change per year of 10 nm or less with respect to 100 mm length.

16. The precision-polished cordierite-based sintered body as defined in claim 11, wherein the precision-polished cordierite-based sintered body is selected from the group consisting of an ultra-precision mirror, a substrate for an ultra-precision mirror, a scale substrate, a gauge for an encoder, a standard scale for calibration, a reference scale, an optical flat standard, and a photomask standard.

17. The precision-polished cordierite-based sintered body as defined in claim 11, wherein the precision-polished cordierite-based sintered body is an ultra-precision mirror.

* * * * *